US006994530B2

(12) United States Patent
Fujisawa et al.

(10) Patent No.: US 6,994,530 B2
(45) Date of Patent: Feb. 7, 2006

(54) VIBRATING TYPE COMPRESSOR

(75) Inventors: Yoshiaki Fujisawa, Nitta-machi (JP);
Takehiro Hasegawa, Nitta-machi (JP)

(73) Assignee: Sawafuji Electric Co., Ltd., Tokyo (JP)

( * ) Notice: Subject to any disclaimer, the term of this patent is extended or adjusted under 35 U.S.C. 154(b) by 281 days.

(21) Appl. No.: 10/415,030

(22) PCT Filed: Oct. 23, 2001

(86) PCT No.: PCT/JP01/09274

§ 371 (c)(1),
(2), (4) Date: Apr. 23, 2003

(87) PCT Pub. No.: WO02/35095

PCT Pub. Date: May 2, 2002

(65) Prior Publication Data

US 2004/0001768 A1    Jan. 1, 2004

(30) Foreign Application Priority Data

Oct. 25, 2000    (JP)    .............................. 2000-325224

(51) Int. Cl.
*F04B 35/04* (2006.01)
(52) U.S. Cl. ........................................ 417/417; 310/15
(58) Field of Classification Search ................ 417/416, 417/417; 310/12, 27, 28, 15
See application file for complete search history.

(56) References Cited

U.S. PATENT DOCUMENTS

| 3,490,684 | A | * | 1/1970 | Meijer et al. ................ 417/417 |
| 3,814,550 | A | * | 6/1974 | Adams ......................... 417/417 |
| 4,427,906 | A | | 1/1984 | Kainuma et al. |
| 4,632,645 | A | * | 12/1986 | Kawakami et al. ............ 310/27 |
| 5,704,771 | A | * | 1/1998 | Fujisawa et al. ............. 417/417 |
| 6,848,892 | B1 | * | 2/2005 | Morita et al. ................ 417/417 |

FOREIGN PATENT DOCUMENTS

| JP | 56-129080 | | 10/1981 |
| JP | 56-129780 | | 10/1981 |
| JP | 63-38384 Y2 | | 10/1988 |
| JP | 1-12950 | | 3/1989 |
| JP | 4-121464 | * | 4/1992 |
| JP | 2000-205123 A | | 7/2000 |

* cited by examiner

*Primary Examiner*—Michael Koczo, Jr.
(74) *Attorney, Agent, or Firm*—McGlew & Tuttle PC

(57) ABSTRACT

A vibration type compressor related to the present invention, in which a compressor main body 3 is built into a gastight vessel 2 including a yoke 7-1, a magnetic path member 7 formed from a column-shaped core pole 7-2, a permanent magnet 12 arranged in the magnetic path, an electromagnetic coil 14 which is arranged within an annular magnetic gap 13 between the magnetic path members 7 by being supported by a mechanical vibration system to as to be able to vibrate and is wound around a lead plate to perform the connection treatment of a terminal thereof, a piston 16 connected to the electromagnetic coil 14, and a cylinder block 8 which closes the yoke 7-1 and in the interior of which is formed the cylinder portion 17 housing the piston 16, characterized in that the permanent magnet 12 is formed from a neodymium magnet or a rare-earth magnet and in that the cylindrical permanent magnet 12 is divided into four parts in the axial direction thereof, the four-part divided magnet being bonded and fixed to the side of the core pole 7-2, whereby the vibration type compressor is miniaturized and its efficiency is increased.

5 Claims, 15 Drawing Sheets

Prior Art

Prior Art (A)   (B)

VIBRATING TYPE COMPRESSOR

FIELD OF THE INVENTION

The present invention relates to a vibration type compressor and, more particularly, to a vibration type compressor built into a gastight vessel, in particular, for use in a refrigerator etc., which vibration type compressor comprises a bottomed, cylindrical outer core, an inner core which, along with the outer core, constitutes a magnetic path (a core pole), a permanent magnet disposed in the inner core of the magnetic path in a form divided into a plurality of parts, an electromagnetic coil which is disposed in an annular gap formed by the permanent magnet and the outer core and is supported by a mechanical vibration system so as to be able to vibrate, a piston connected to the electromagnetic coil, and a cylinder block housing the piston, and which vibration type compressor compresses a low-pressure refrigerant flowing into the gastight vessel and delivers a high-pressure refrigerant by supplying an alternating current to the electromagnetic coil, thereby to vibrate the piston connected to the electromagnetic coil.

DESCRIPTION OF THE RELATED ART

A conventional vibration type compressor causing a low-pressure refrigerant and delivering a compressed high-pressure refrigerant has already been known in the Japanese Patent Publication No. 63-8315(the U.S. Pat. No. 4,427,906 and the German Patent DE-C2-3109455) etc.

More specifically, as shown in FIG. 21, there is publicly known a vibration type compressor which is configured on the basis of a principle similar to that of what is called a moving wire ring type speaker and supplies an alternating current performing resonance with a resonance spring (shown in FIG. 23, which will be described later) which supports a moving-line ring (called an electromagnet coil in the present application). Incidentally, in FIG. 21, the numeral 71 denotes an electromagnetic coil, the numeral 72 a ferrite magnet, the numeral 73 an outer core, the numeral 74 an inner core, the numeral 74-1 a magnetic pole, and the numeral 75 an annular magnetic gap.

As described in the public gazette, a rectangular-wave AC voltage as indicated by (A) in FIG. 22, which is generated when two switching transistors alternately repeat on-off operations, is applied to the electromagnetic coil 71 shown in FIG. 21, and this electromagnetic coil 71 is vertically driven between a condition indicated by the arrow a and a condition indicated by the arrow b. The above-described conditions a and b indicate the electromagnetic coil 71, respectively, in the state of completion of compression and the state of completion of suction. And the driving current i of the electromagnetic coil 71 is a corrector current (Ic) when the two switching transistors are on and is indicated by (B) in FIG. 22.

Based on such a principle as described above, in a vibration-type compressor, applying the rectangular-wave AC voltage having a frequency in synchronization with the characteristic vibration cycles of this mechanical vibration system to the electromagnetic coil 71 driving a mechanical vibration system (which will be described in FIG. 23) enables driving a piston of the mechanical vibration system with a good efficiency, compressing a low-pressure refrigerant flowing into a gastight vessel by driving the piston, and delivering it as a high-pressure refrigerant FIG. 23 is a sectional view of a conventional vibration type compressor and FIG. 24 is a sectional view taken along line X—X of FIG. 23.

In FIG. 23 and FIG. 24, the numerals 71 to 75 correspond to those of FIG. 21, the numerals 76 and 77 denote a resonance spring, the numeral 78 a coil-supporting member, the numeral 79 a piston, the numeral 80 an intake valve, the numeral 81 a compression cylinder, the numeral 82 an exhaust valve, the numeral 83 a cylinder block, the numeral 84 a distance case, the numeral 85 a screw, the numeral 86 a suction port, the numeral 86-1 an inner suction pipe, the numeral 87 a delivery port, the numerals 87-1 and 87-2 a delivery pipe, the numeral 88 a lead terminal, the numeral 88-1 a lead wire, and the numeral 89 a housing.

The ferrite magnet 72 is formed in arc form and arranged along the inner circumferential surface of the outer core 73 in the shape of a pot. And the ferrite magnet 72 is magnetized in the thickness direction, i.e., in a radial direction in FIG. 24. Therefore, within the inner core 74 forming a magnetic path along with the outer core 73, there is formed a magnetic space, namely, the annular magnetic gap 75 in a space in which a magnetic pole 74-1 formed so as to be opposite to the inner circumferential surface of the ferrite magnet 72 and the ferrite magnet 72 are opposed each other.

In this annular magnetic gap 75 is arranged an electromagnet coil 71, which is supported by a pair of resonance springs 76, 77 opposed to each other via coil-supporting member 78 to as to be able to vibrate. Furthermore, the piston 79 is provided in substantially combination with the electromagnetic coil 71 through the coil-supporting member 78 and is driven by the electromagnetic coil 71. Also, the cylinder block 83 provided with the compression cylinder 81 engaged with the piston 79 is fixed to the outer core 73 by the screw 85 for fixing the cylinder through the distance case 84.

In a vibration type compressor thus configured, when an alternating current is supplied to the electromagnetic coil 71 through the lead terminal 88 and the lead wire 88-1, this electromagnetic coil 71 vibrates in response to the frequency of the supplied alternating current, whereby the piston 79 is driven. By the reciprocating motion of this piston 79, a refrigerant, for example, Freon gas flowing in from the suction port 86 is guided within a housing 89 to the direction indicated by an arrow (a dotted line), further flows through a inner suction pipe 86-1, and is guided to the interior of the compression cylinder 81 as indicated by an arrow (a dotted line).

And a high-pressure refrigerant compressed by the piston 79 is delivered in the direction indicated by an arrow (a solid line) and jetted to a condenser of a cooling system through, for example, a delivery pipes 87-1, 87-2 and a delivery port 87. Incidentally, it is needless to say that the suction and exhaust of a refrigerant in the compression cylinder 81 is performed by the alternate opening and closing operations of the intake valve 80 and the exhaust valve 82 in response to the reciprocating motion of the piston 79.

Incidentally, the winding of the electromagnetic coil 71 has so far been fabricated in such a manner described below. The description will be provided with reference to FIG. 25 showing the winding construction of a conventional electromagnetic coil 71, which is an improvement on the winding construction of the electromagnetic coil 71 shown in FIG. 23. Conventionally, part of the electromagnetic coil 71 is wound on a winding jig having a prescribed diameter for the inner side and the winding work is suspended at a point of time when the winding of part of the electromagnetic coil 71 for this inner side is finished, four coil yoke plates 95 and two lead plates 96 to transmit a force generated in this electromagnetic coil 71 to the piston 79 are manually positioned in part of the electromagnetic coil wound on the inner side, and after that, the winding work is carried out again for the remainder of the electromagnetic coil 71 for the outer side. That is, the electromagnetic coil 71 of a prescribed number of turns is wound with such a structure that the four coil yoke plates 95 and two lead plates 96 are sandwiched inside, and a winding start end and a winding finish end of the electromagnetic coil 71 are wound respectively on the two lead plates 96 to perform electrical connection.

After that, the electromagnetic coil 71 is removed from the winding jig and is then solidified by varnish treatment and a flange portion 97 to which an end of the piston 79 is welded is spot welded to each piece end of the yoke plates 95 of the electromagnetic coil 71 thereby to form the piston 79 and the electromagnetic coil 71 in a substantially integral construction.

In conventional methods of fixing the outer core 73 and cylinder block 83 described in FIG. 23, screw cramping is performed as follows:

<1> screw cramping is performed by increasing the diameter of the whole outer core 73;

<2> as shown in FIG. 23, screw cramping is performed by giving a bulge to the bottom end portion of the outer core 73, that is, by increasing the diameter of part of the outer core 73; and <3> as shown in FIG. 27 (this FIG. 27 shows an improvement on the fixing shown in FIG. 23, and basically a similar function is provided) and FIG. 28, screw cramping is performed by inserting other pieces which ensure a screw cramp width in the outer core 73.

In FIG. 27 and FIG. 28, the same parts are given the same numerals as shown in FIG. 23. In FIG. 27, a screw cramp width is ensured by fixing an annular piece 98-1 in which a screw hole is cut to the interior of the outer core 73 and the cylinder block 83 is fixed to the screw hole cut in the annular piece 98-1 by the screw 85. In FIG. 28, the outer core 73 and the cylinder block 83 are fixed together by a screw through a fixing piece 98-2 which ensures a screw cramp width between the outer core 73 and the cylinder block 83.

A high-coercive-force magnet represented by a ferrite-base magnet is used as the permanent magnet 72 used in a conventional vibration type compressor (corresponding to the ferrite magnet 72 of FIG. 23). At the same time, this permanent magnet 72 is firmly fixed to the inner circumferential surface of the outer core 73 and the adopted construction is such that the electromagnetic coil 71 is arranged in the annular magnetic gap 75 between this permanent magnet 72 and the inner core 74, with the result that the miniaturization of a vibration type compressor has been impeded.

In conjunction with this miniaturization of a vibration type compressor, high-efficiency design of a vibration type compressor is further demanded and also in using a neodymium magnet or a rare-earth magnet having higher performance than that of a ferrite-base magnet, it is necessary that in the vibration type compressor of the present application, the permanent magnet 72 be magnetized along the whole circumference in a radial direction (in the direction of the radius) in a space where the electromagnetic coil 71 is arranged, i.e., in the annular magnetic gap 75.

The most preferable shape of the permanent magnet 72 is a cylindrical shape (including an annual shape). However, because the neodymium magnet or rare-earth magnet used here has high performance and a high permanent magnetic flux density Br, the manufacturing of a magnet poses drawbacks as described below:

(1) During the forming performed by applying a magnetic field to make the orientation of the whole of the grains a radial direction, the orientation of the grains cannot be sufficiently ensured because of a small sectional area of the inside diameter of the magnet and obtained properties are inferior to the original characteristics of the material for the magnet.

(2) Because a magnetic field is applied in a radial direction, forming is performed only in one place.

(3) After forming and sintering, polishing is performed to obtain a size. In this shape, i.e., the cylindrical shape, it is difficult to obtain a size by polishing the inside diameter and hence the cost becomes high.

On the other hand, a conventional method of fixing by use of a screw cramp between the outer core 73 and the cylinder block 83 which is used in a conventional vibration type compressor offers drawbacks as described below:

(4) When the diameter is increased as described in <1> and <2> above, the outer core 73 becomes thicker than necessary although the original function of the outer core is to allow a magnetic flux to pass, with the result that the weight and direct material cost increase.

(5) The working cost increases by making a hole and a screw hole in the outer core 73 and the cylinder block 83.

(6) Even when the diameter of the outer core 73 is optimized as in <3>, because of the use of another piece the working cost and direct material cost increase by this amount.

(7) In the case of screw cramping of the cylinder block 83 to the outer core 73, it is necessary to perform uniform tightening by use of three or four screws. If this is impossible, the cylinder block 83 and the resonance springs 76, 77 come into non-uniform contact and this may cause poor performance. Therefore, due care should be used in assembling.

In short, the direct material cost and working cost increase, increases in weight and assembling becomes difficult.

Furthermore, the conventional lead plate 96 shown in FIG. 25 has a straight shape. Therefore, when spot welding is performed with a terminal 71-1 of the electromagnetic coil 71 bound around the lead plate 96 as shown in FIG. 26 (A), the terminal 71-1 of the electromagnetic coil 71 shifts from a weld 96-1 as shown in FIG. 26(B), making welding difficult.

The present invention was made in view of the points and has as its object the provision of a vibration type compressor in which a permanent magnet selection is made from the standpoint of cost and performance and a permanent magnet having a high efficiency as a magnetic circuit is selected and used by being divided into an optimum number of parts, which has such a structure that the permanent magnet is firmly fixed to the inner core side, provides a component part structure suitable for mass production without a rise in the direct material cost and the working cost and without an increase in weight, and makes an assembly easy.

BRIEF SUMMARY OF THE INVENTION

In the present invention there is provided a vibration type compressor, in which a compressor main body is housed in a gastight vessel comprising a power supply terminal, a suction pipe into which a low-pressure refrigerant flows and a delivery pipe from which a high-pressure refrigerant flows, the compressor main body comprising a cylindrical yoke, a magnetic path member formed from a column-shaped core pole which closes an end of the yoke and protrudes to inside coaxially, a cylindrical permanent magnet arranged in the magnetic path, an electromagnetic coil which is arranged within a gap between the magnetic path members by being supported by a mechanical vibration system to as to be able to vibrate and is wound around a lead plate to perform the connection treatment of a terminal thereof, a supporting member which supports the electromagnetic coil, a piston connected to the electromagnetic coil through the supporting member, and a cylinder block which closes the other end of the cylindrical yoke and in the interior of which are formed a low-pressure chamber communicating with the suction pipe, a high-pressure chamber communicating with the delivery pipe and a cylinder housing the piston, the vibration type compressor being so configured as to vibrate the piston connected to the electromagnetic coil by supplying an alternating current to the electromagnetic coil and to discharge a compressed high-pressure refrigerant from the delivery pipe, characterized in that the cylindrical permanent magnet is formed from a neodymium magnet or a rare-earth magnet and in that the cylindrical permanent magnet is divided into at least four parts in the axial direction thereof, the divided magnets being bonded and fixed to the cylindrical core pole side.

The vibration type compressor is characterized in that the four-part divided magnet is formed in such a manner that the angle of inside diameter of both arc-shaped ends of each of the four-part divided magnets with respect to an axis center is not less than 88° but not more than 89.8°, both arc-shaped ends of each magnet being bonded and fixed to the column-shaped core pole side each with a gap.

Also, the vibration type compressor is characterized in that in the core pole is formed a magnet-mounting groove to which the four-part divided magnet is bonded, in that an end portion of the magnet-mounting grooves is provided with a clearance groove for positioning having a diameter smaller than the outside diameter of the magnet-mounting groove so that the magnet can be bonded in a prescribed position of the core pole to precise dimensions, and in that a small rib is provided in a circumferential portion of the engaging portion of the core pole where the core pole engages with the cylindrical yoke. Also, the vibration type compressor is characterized in that the cylindrical permanent magnet is formed from a neodymium magnet or a rare-earth magnet and in that the cylindrical permanent magnet is divided into at least four parts in the axial direction thereof, each of the divided magnets having a plating-less surface, being bonded and fixed to the cylindrical core pole side.

Furthermore, the supporting member comprises a flange and two base material; the flange comprising an inside-diameter boss portion, which has in the central portion thereof a diameter into which the piston is inserted, and an outside-diameter rib portion, which has the outside diameter of an electromagnetic coil supporting plate which supports the electromagnetic coil, with a plurality of holes being drilled in a disk portion formed by the inside-diameter boss portion and the outside-diameter rib portion; and the two base materials formed from a disk-shaped insulator each comprising an inside-diameter rib portion, which has in the central portion thereof a diameter into which the inside-diameter boss portion provided in the flange portion is fitted, engaging members, which are provided on a surface on the side opposite to the side where the inside-diameter rib portion is formed and in which a locking convexity and a locking concavity are provided in positions corresponding to the holes drilled in the disk portion of the flange, and at least one protrusion, which is provided at an end edge portion of the surface provided with the engaging members, and the supporting member may be configured to be of such a construction that the flange is supported and fixed from both sides thereof in a sandwiched condition by means of the two base materials.

Because the permanent magnet is firmly fixed to the core pole side and because from the relation between cost and magnetic properties of the permanent magnet, the permanent magnet is divided by an optimum number of division, a neodymium magnet or rare-earth magnet having a high permanent magnetic flux density Br can be effectively used and the efficiency of the vibration type compressor can be improved.

The four-part divided magnet is formed in such a manner that the angle of inside diameter of both arc-shaped ends of each of the four-part divided magnets with respect to an axis center is not less than 88° but not more than 89.8°, both arc-shaped ends of each magnet being bonded and fixed to the column-shaped core pole side each with a gap. Therefore, no crack will occur in each magnet.

BRIEF DESCRIPTION OF THE SEVERAL VIEWS OF THE DRAWINGS

FIG. 24 is a sectional view taken along line X—X of FIG. 23;

DETAILED DESCRIPTION OF THE INVENTION

Figure 1:
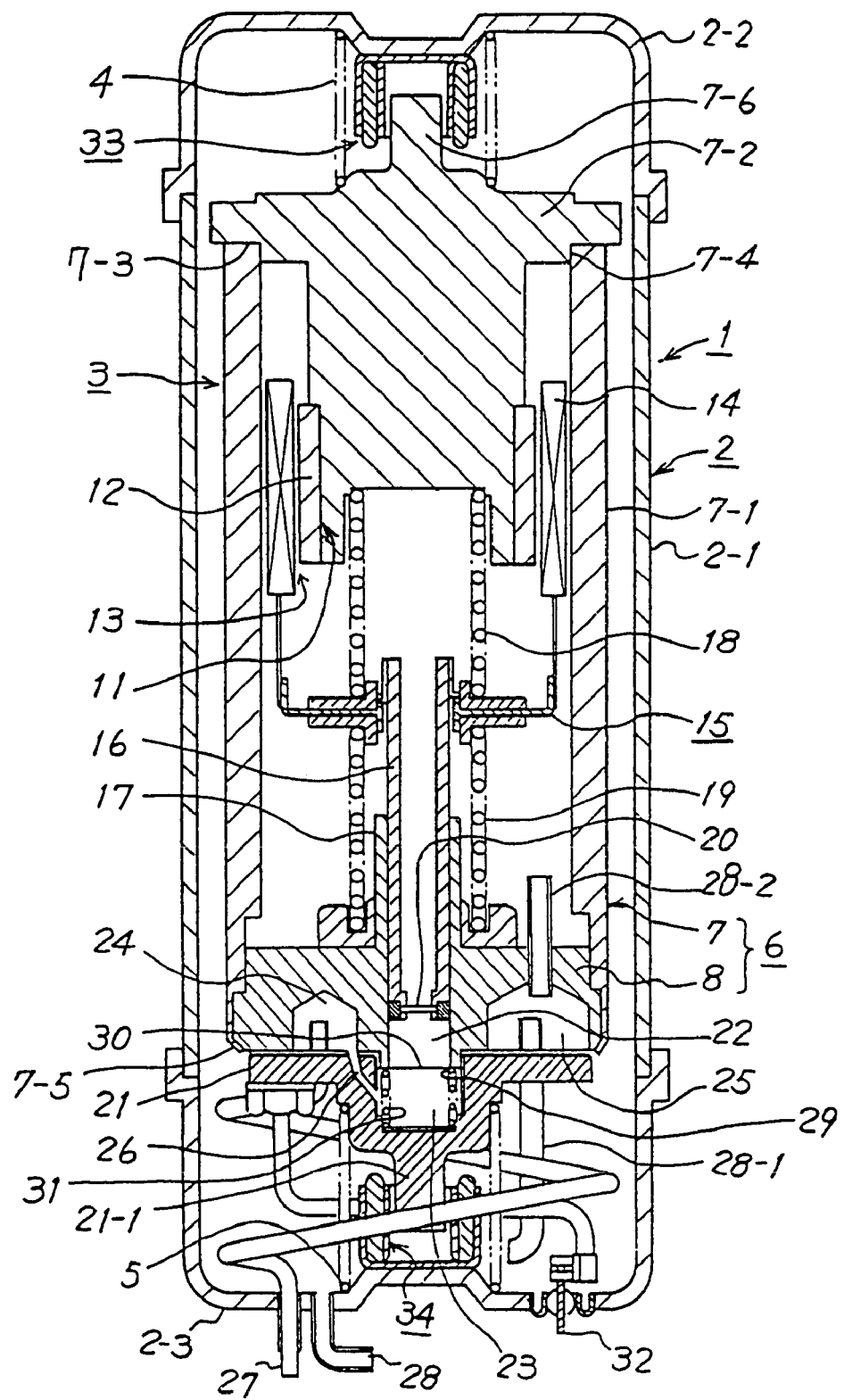
FIG. 1 is a sectional view of an embodiment of a vibration type compressor related to the present invention.

FIG. 1 shows a sectional view of an embodiment of a vibration type compressor related to the present invention.

In this figure, a vibration type compressor 1 is configured in such a manner that within a cylindrical gastight vessel 2 constituted by a cylinder 2-1 and covers 2-2, 2-3 which close both opening ends of the cylinder 2-1, a compressor main body 3 is elastically supported by use of springs 4, 5 etc.

A casing 6 of the compressor main body 3 is configured in such a manner that there are fixed a magnetic path member 7, i.e., an assembly of a cylindrical yoke 7-1 which is an outer core and of a core pole 7-2 which is a flanged inner core closing an end, i.e., the top end of the yoke 7-1 provided with a coaxial cylindrical body protruding to inside, and a cylinder block 8 at the other end, i.e., the bottom end of the magnetic path member 7.

In an upper portion of the core pole 7-2 are formed a stepped portion 7-3 which perpendicularly intersects the inner circumferential surface of the yoke 7-1 and an engaging portion 7-4 which engages against the inner circumferential surface of the yoke 7-1. And as shown in FIG. 1, the magnetic path member 7 is configured by fixing the core pole 7-2 and the yoke 7-1 together by screw cramping or welding in such a manner that the engaging portion 7-4 is caused to engage against the inner circumferential surface of the yoke 7-1.

Furthermore, the cylinder block 8 is basically formed in the shape of a disk having a large wall thickness and is engaged against the bottom end of the magnetic path member 7. And a crimping portion 7-5 is formed at the bottom end of the magnetic path member 7, i.e., in the leading end portion of the yoke 7-1. In this crimping portion 7-5, the full circumference or a plurality of places of the bottom end surface of the cylinder block 8 engaged into the inside diameter portion of the yoke 7-1 are crimped so that the cylinder block 8 is fixed to the bottom end of the magnetic path member 7.

An end of the core pole 7-2 is a stepped small-diameter portion where a magnet-mounting groove 11 is formed, and a permanent magnet 12 is firmly fixed along this annular side outer surface, i.e., the outer circumferential surface of the magnet-mounting groove 11. Between this cylindrical permanent magnet 12 and the cylindrical yoke 7-1 is formed an annular magnetic gap 13. A neodymium magnet or a rare-earth magnet is used as the permanent magnet 12, and in order to ensure its magnetic properties and reduce the outside diameter dimension of the vibration type compressor 1, this permanent magnet is formed in the shape of an arc and magnetized in the thickness direction, i.e., in a radial direction (in the direction of the radius).

The neodymium magnet or rare-earth magnet is a high-performance magnet and has a permanent magnetic flux density Br. Therefore, the efficiency of a gap where an electromagnetic coil 14 is placed, i.e., the annular magnetic gap 13 is increased and hence a high efficiency of the vibration type compressor 1 is obtained. And as will be described later in detail, a magnet divided into four parts is used as this permanent magnet 12.

In the annular magnetic gap 13 the electromagnetic coil 14 is arranged so as to be able to reciprocate in the direction of the axis line of the casing 6, i.e., vertically. This electromagnetic coil 14 is wound around a supporting member 15, and this supporting member 15 is firmly fixed to a cylindrical piston 16 which is concentric with the axis line of the casing 6.

Therefore, the electromagnetic coil 14 and the piston 16 are substantially integral with each other. This piston 16 fits in a sliding manner into a cylinder portion 17 which is integrally provided in the cylinder block 8, so that the piston 16 penetrates into the casing 6. Furthermore, as shown in FIG. 1, a resonance spring 18 is interposed between the core pole 7-2 and the supporting member 15 and a resonance spring 19 is interposed also between the supporting member 15 and the cylinder block 8. Therefore, it follows that the piston 16 is supported by a pair of upper and lower resonance springs 18, 19. Furthermore, a suction valve 20 is provided at the bottom end of the piston 16.

A cap-like cover 21 is firmly fixed to the lower part of the cylinder block 8 by means of a screw which is omitted in the drawing. Between this cap-like cover 21 and the cylinder block 8, a delivery valve chamber 23 is provided further below a cylinder chamber 22, which is positioned below the piston 16 within the cylinder portion 17 and, at the same time, a high-pressure chamber 24 and a low-pressure chamber 25 are formed by closing a hole provided in the cylinder block 8 by means of the cap-like cover 21.

In the cap-like cover 21 is drilled a communication passage 26 which provides communication between the delivery valve chamber 23 and the high-pressure chamber 24. Furthermore, a delivery pipe 27 which communicates with the high-pressure chamber 24 is provided. This delivery pipe 27 is drawn out to outside in such a manner as to pierce through the cover 2-3 and is connected, for example, to a capacitor or a condenser which contains condensing vapor of a refrigerator which is omitted in the drawing. That is, a high-pressure refrigerant compressed by the compressor main body 3 is delivered to this condenser. This compressed high-pressure refrigerant passes through the condenser and other equipment to become a low-pressure refrigerant. This low-pressure refrigerant is introduced into the casing 6, i.e., the interior of the compressor main body 3 via a suction pipe 28 provided in such a manner as to pierce through the cover 2-3, a tube 28-1 which pierces through the cap-like cover 21 and communicates with the low-pressure chamber 25, and a tube 28-2 which provides communication between the low-pressure chamber 25 and the interior of the casing 6.

In the delivery valve chamber 23 are housed a delivery valve 30 which can seat on a valve seat 29 provided on the cylinder block 8 at the bottom end of the cylinder chamber 22 and a suppression spring 31 which urges the delivery valve 30 in the direction in which the delivery valve 30 seats on the valve seat 29.

Furthermore, a power supply terminal 32 is attached to the cover 2-3. This power supply terminal 32 is introduced into the casing 6 and connected to an end of the electromagnetic coil 14, though not clearly shown in FIG. 1. The other end of the electromagnetic coil 14 is connected to the gastight vessel 2 by means of a lead wire etc. which is omitted in the drawing. Therefore, by applying an alternating voltage to between the power supply terminal 32 and the gastight vessel 2, it is possible to supply an alternating current to the electromagnetic coil 14.

Moreover, in the core pole 7-2 and the cap-like cover 21, shock-absorbing members 33 and 34 which are formed in ring shape from an elastic body such as rubber, for example, are provided in positions corresponding to protrusions 7-6 and 21-1. Therefore, it follows that undesired oscillation of the compressor main body 3 can be suppressed by these shock-absorbing members 33,34 to a maximum range.

When an alternating current flows through the electromagnetic coil 14, the piston 16 vibrates vertically along with the electromagnetic coil 14 according to the polarity of this alternating current and the vertical vibration of the piston 16 is amplified by the pair of resonance springs 18, 19. The suction valve 20 and delivery valve 30 perform a pumping action due to the vertical vibration of this amplified piston 16. A fluid such as a refrigerant which is introduced into the gastight vessel. 2 due to this pumping action flows into the interior of the casing 6 through the suction pipe 28, tube 28-1, low-pressure chamber 25 and tube 28-2, flows into the discharge valve chamber 23 through the piston 16, the suction valve 20, the cylinder chamber 22 and the deliver valve 30 and flows out to the condenser of a refrigerator etc. further through the communication passage 26, high-pressure chamber 24 and delivery pipe 27.

Figure 23:
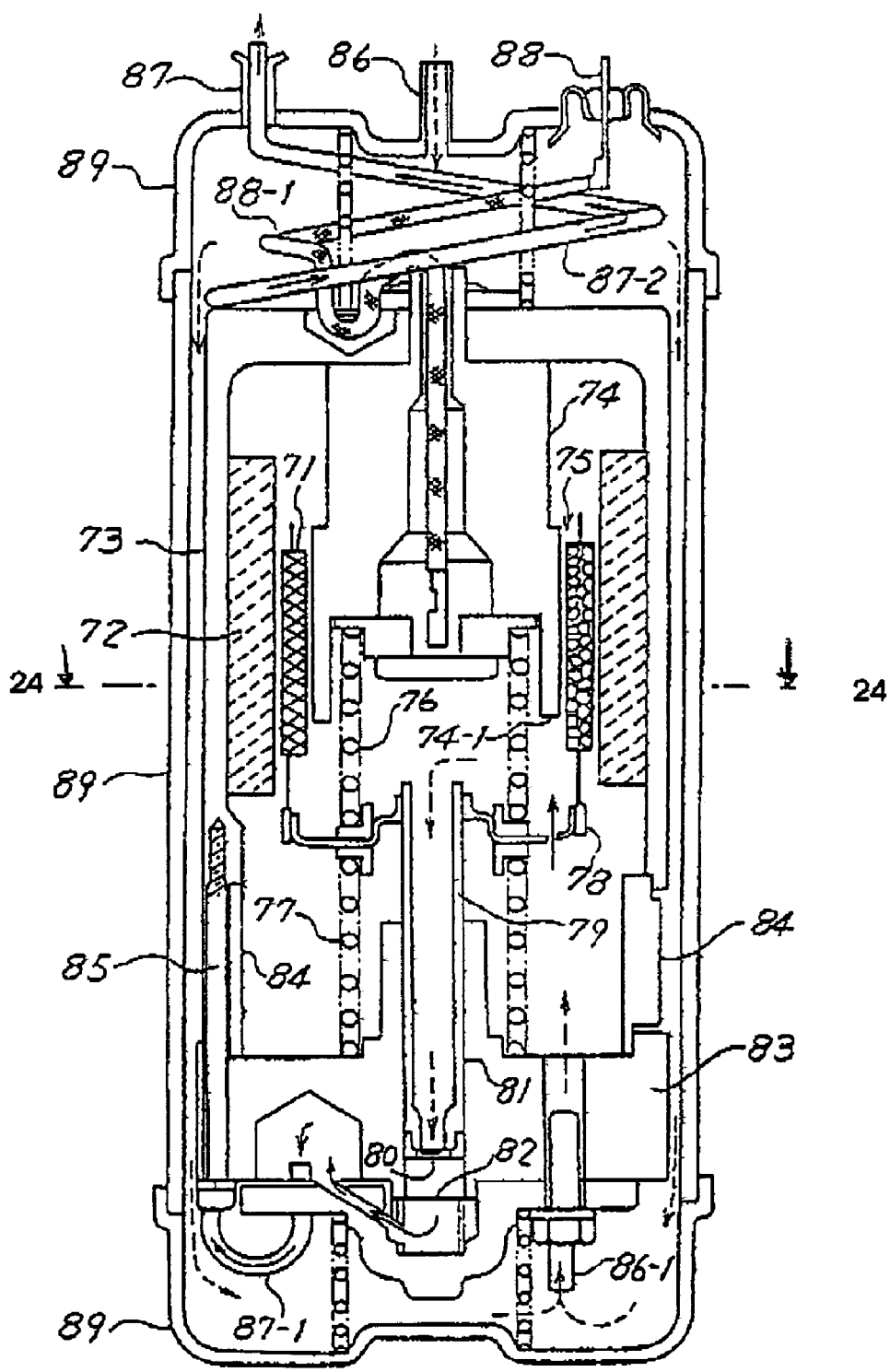
FIG. 23 is a sectional view of a conventional vibration type compressor and FIG. 24 is a sectional view taken along line 24—24 of FIG. 23.
Figure 24:
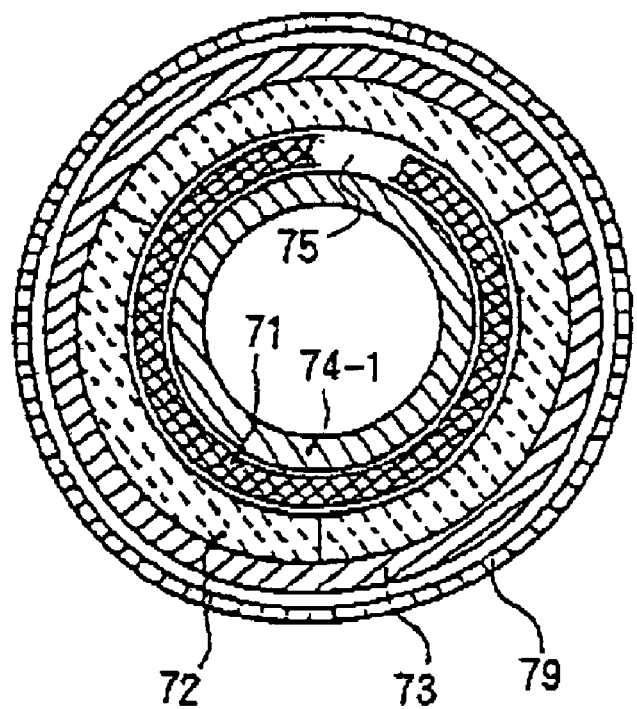
Figure 25:
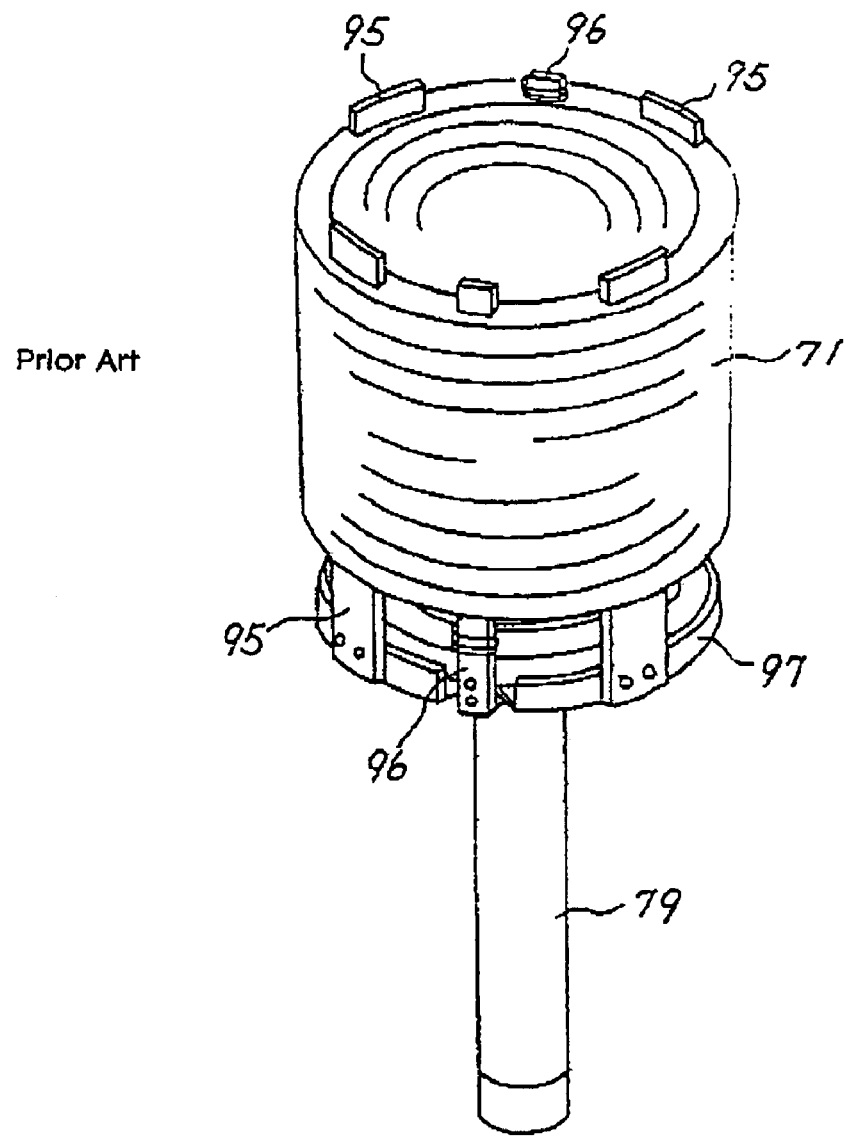
FIG. 25 is a perspective view of an electromagnetic coil to which a conventional piston is connected.
Figure 26:
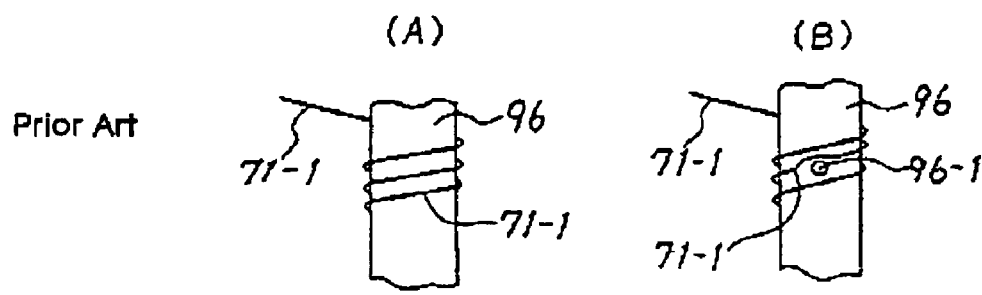
FIG. 26 is a view to explain the connection of a terminal of an electromagnetic coil in the portion of a conventional lead plate.
Figure 27:
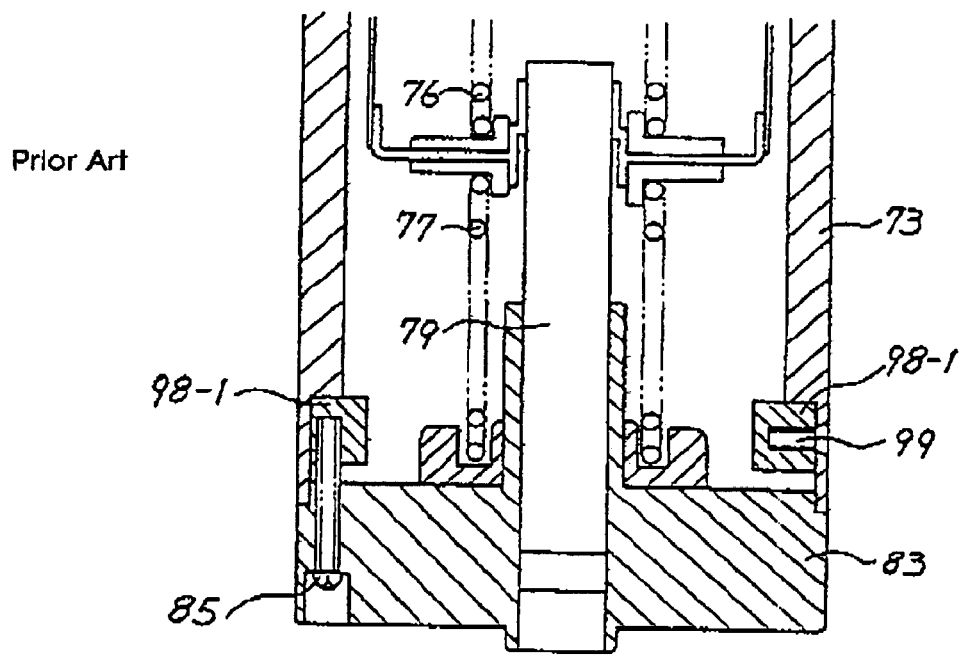
FIG. 27 is a view to explain the fixing of a conventional inner core and a cylinder block.
Figure 28:
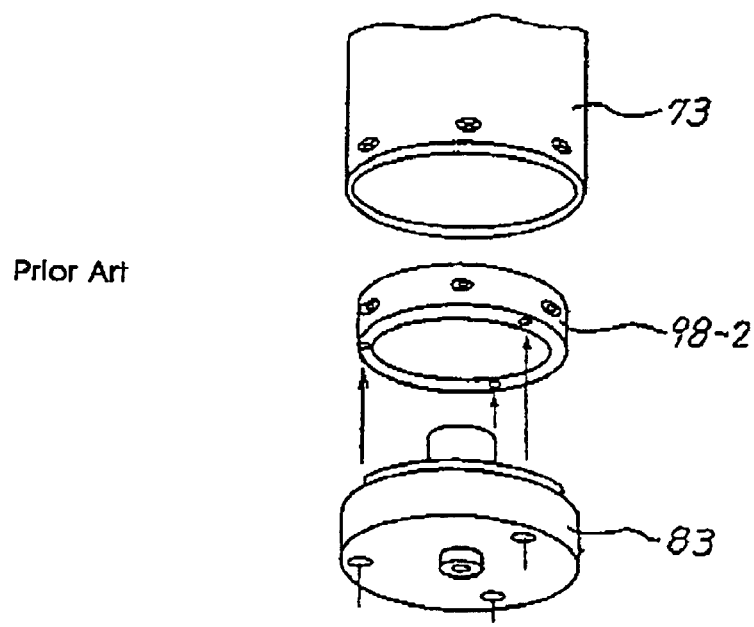
FIG. 28 is an exploded view to explain the fixing of a conventional inner core and a cylinder block.

Incidentally, the vibration type compressor shown in FIG. 1 differs from the conventional one shown in FIG. 23 in the shape of the core pole 7-2 which will be described in FIG. 2 to FIG. 6, the permanent magnet 12 firmly fixed to the magnet-mounting groove 11 provided in the outer peripheral surface of this core pole 7-2 (the difference from FIG. 23 being not expressed in FIG. 1), the method of fixing the yoke 7-1 and the cylinder block 8 together, which will be described in FIG. 10, the portion of a lead plate 36 when a terminal 14-1 of the electromagnetic coil 14 is electrically connected to this lead plate 36, which will be described in FIG. 11 to FIG. 15 (the difference from FIG. 23 being not expressed in FIG. 1), and the construction of the supporting member 15 which supports the electromagnetic coil 14, which will be described in FIG. 16 to FIG. 20.

Figure 6:
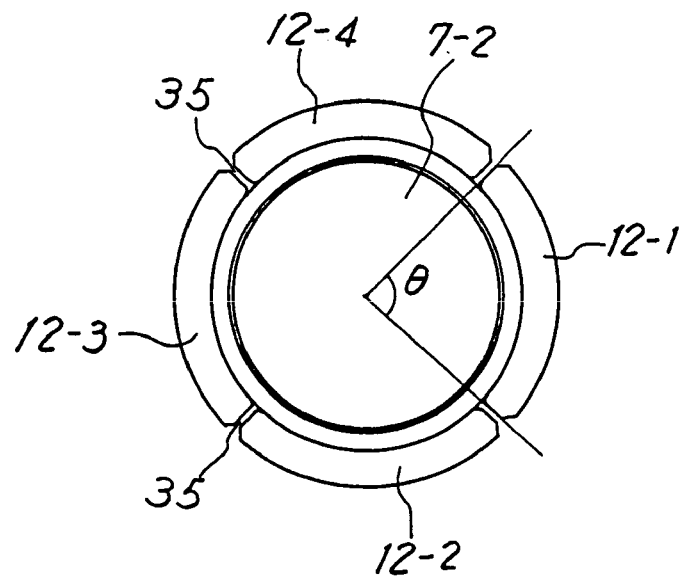
FIG. 6 is a cross-sectional view in the position of a permanent magnet divided into four parts.

The cylindrical permanent magnet 12 shown in FIG. 1 is divided into four parts in its axial direction, and as shown in FIG. 6 four-part divided permanent magnets 12-1 to 12-4 are respectively firmly fixed to the magnet-mounting groove 11 which is provided in the outer peripheral surface of the core pole 7-2 in a cylindrically restored form.

Figure 2:
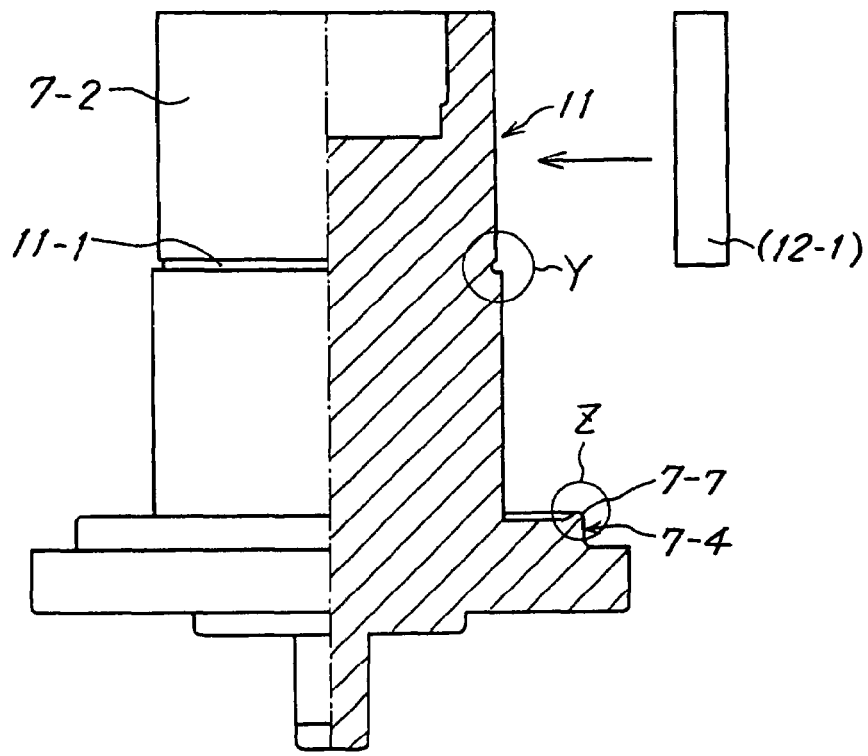
FIG. 2 is a partial sectional view of an embodiment of a core pole.
Figure 3:
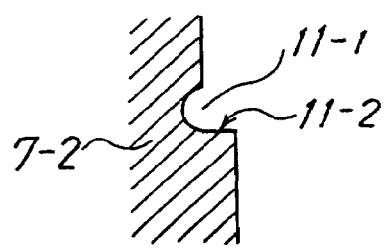
FIG. 3 is an enlarged view of Part Y of FIG. 2.
Figure 4:
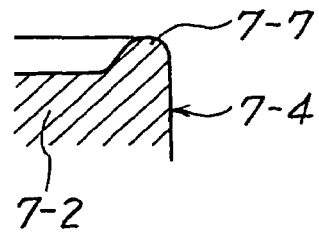
FIG. 4 is an enlarged view of Part Z of FIG. 2.

As shown in FIG. 2, in the core pole 7-2 is formed the magnet-mounting groove 11 on which the four-part divided permanent magnet 12-1 etc. are mounted. And as shown in FIG. 3, an end portion of the magnet-mounting groove 11 is provided with a concave clearance groove 11-1 for positioning having a diameter a little smaller than the outside diameter of the magnet-mounting groove 11 so that this permanent magnet 12-1 can be bonded in a prescribed position of the core pole 7-2 to precise dimensions, and as shown in FIG. 4, a small rib 7-7 is provided in a circumferential portion of the engaging portion 7-4 of the core pole 7-2.

Figure 5:
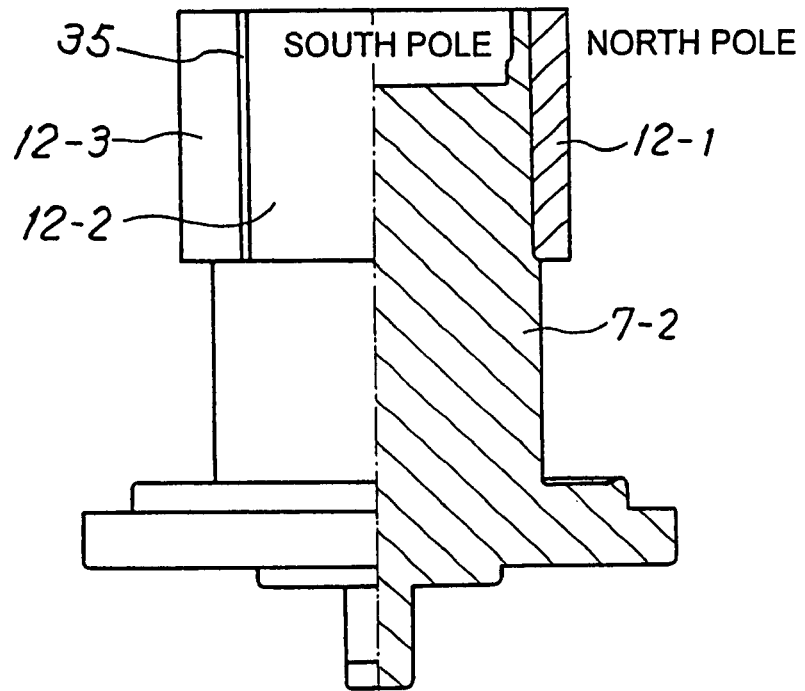
FIG. 5 is a partial sectional view of an embodiment of a core pole to which a permanent magnet divided into four parts is fixed.

The four-part divided permanent magnets 12-1 to 12-4 are respectively fixed to the magnet-mounting groove 11 of the core pole 7-2. In this fixing, in a vertical position as shown in FIG. 5, an adhesive is caused to flow into a gap between the core pole 7-2 and the permanent magnets 12-1 to 12-4 or an adhesive is applied to the magnet-mounting groove 11 of the core 7-2. After that, the permanent magnets 12-1 to 12-4 are stuck by hardening the adhesive by heating. Thus the permanent magnets 12-1 to 12-4 are bonded and fixed to the core pole 7-2.

At this time the whole adhesive spreads over and the amount of adhesive increases partially especially in the clearance groove 11-1, thereby increasing the adhesive force of the end surface portions of the permanent magnets 12-1 to 12-4. The amount of adhesive is determined in consideration of dimensional variations of the parts. However, even when the adhesive which is caused to flow into the magnet-mounting groove 11 or applied thereto overflows the clearance groove 11-1 and flows down the outside diameter surface of the core pole 7-2 just under, the adhesive is prevented by the small rib 7-7 provided in the circumferential portion of the engaging portion 7-4 of the core pole 7-2 from flowing to the engaging portion 7-4. Therefore, it becomes unnecessary to strictly control the amount of adhesive.

To ensure production without variations in the performance of the vibration type compressor 1, it is necessary to fix the permanent magnets 12-1 to 12-4 in a prescribed position of the core pole 7-2 to precise dimensions. Because the concave clearance groove 11-1 for positioning which is a little smaller than the outside diameter of the magnet-mounting groove 11 is provided, the end surface portions of the permanent magnets 12-1 to 12-4 come into complete engagement against a butting portion 11-2 of this clearance groove 11-1, with the result that variations in the bonding position of the permanent magnet 12-1 etc. with respect to the axial direction of the core pole 7-2 can be eliminated. Therefore, it is ensured that the performance of the vibration type compressor 1 can be 100% displayed.

As shown in FIG. 5, the axially four-part divided permanent magnets 12-1 to 12-4 are respectively bonded and fixed to the magnet-mounting groove 11 which is provided in the core pole 7-2 in a cylindrically restored form. The four-part divided magnets 12-1 to 12-4 are formed in such a manner that the angle θ of inside diameter of both arc-shaped ends of each of the four-part divided magnets 12-1 to 12-4 with respect to an axis center is not less than 88° but not more than 89.8°, both arc-shaped ends of each of the permanent magnets 12-1 to 12-4 being cylindrically fixed each with a gap 35.

The reason why the gap 35 is provided between both arc-shaped ends of each of the permanent magnets 12-1 to 12-4 is that as described above, in fixing the permanent magnets 12-1 to 12-4 in a prescribed position of the core pole 7-2 by use of an adhesive, the permanent magnets 12-1 to 12-4 are bonded to the core pole 7-2 by hardening the adhesive by heating. That is, in order to harden the adhesive, heating is first performed from room temperature to a hardening temperature of about 150° C., for example, and cooling is then performed to room temperature.

Unlike usual metals, a neodymium magnet has a negative value of coefficient of thermal expansion. Therefore, the coefficient of thermal expansion of the core pole 7-2, which is a magnetic material, and the coefficient of thermal expansion of the permanent magnets 12-1 to 12-4 are mutually contradictory, and unless the gap 35 is provided between the permanent magnets 12-1 to 12-4 as shown in FIG. 6, a difference in thermal expansion is generated due to the temperature change from room temperature to a hardening temperature and from the hardening temperature to room temperature and a pressure is applied to the permanent magnets 12-1 to 12-4, resulting in the formation of cracks.

The gap 35 is provided between the permanent magnets 12-1 to 12-4 in order to avoid this. However, this produces the following problem. That is, in the vibration type compressor 1, radial magnetization occurs, in other words, the north pole and the south pole occur separately inside and outside the cylinder, the vibration type compressor is of a special construction such that the interior of the cylinder does not repeat the north pole and the south pole unlike the magnetic field of a general rotating-type motor. Therefore, when the magnet is divided, an attenuation of magnetomotive force occurs at boundaries along with repelling. It is desirable to prevent cracks in the magnet while minimizing this attenuation of magnetomotive force, i.e., a deterioration of the performance as far as possible.

Figure 7:
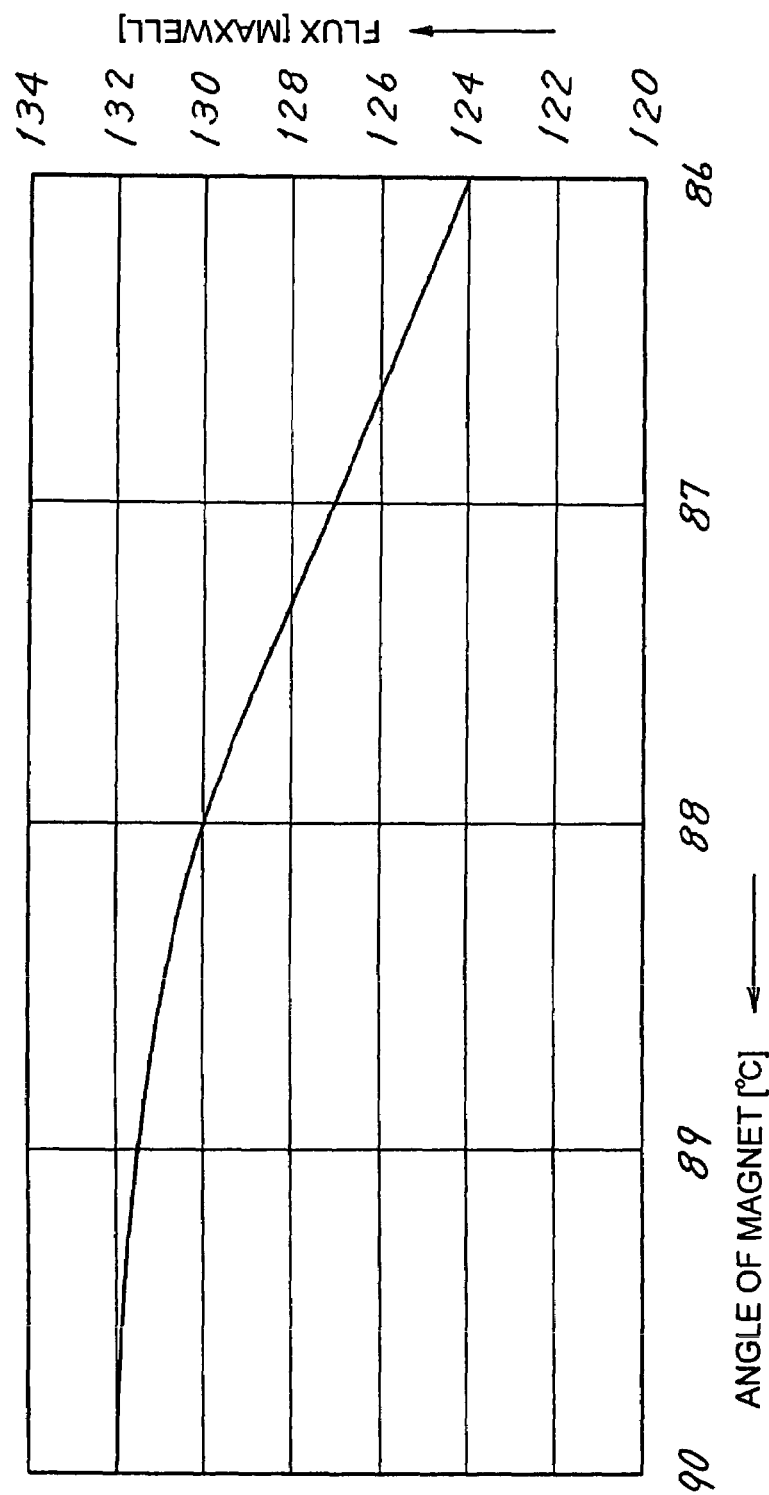
FIG. 7 is a measurement curve characterizing the relation of the angle of the inside diameter and flux of a neodymium magnet in an embodiment.
Figure 8:
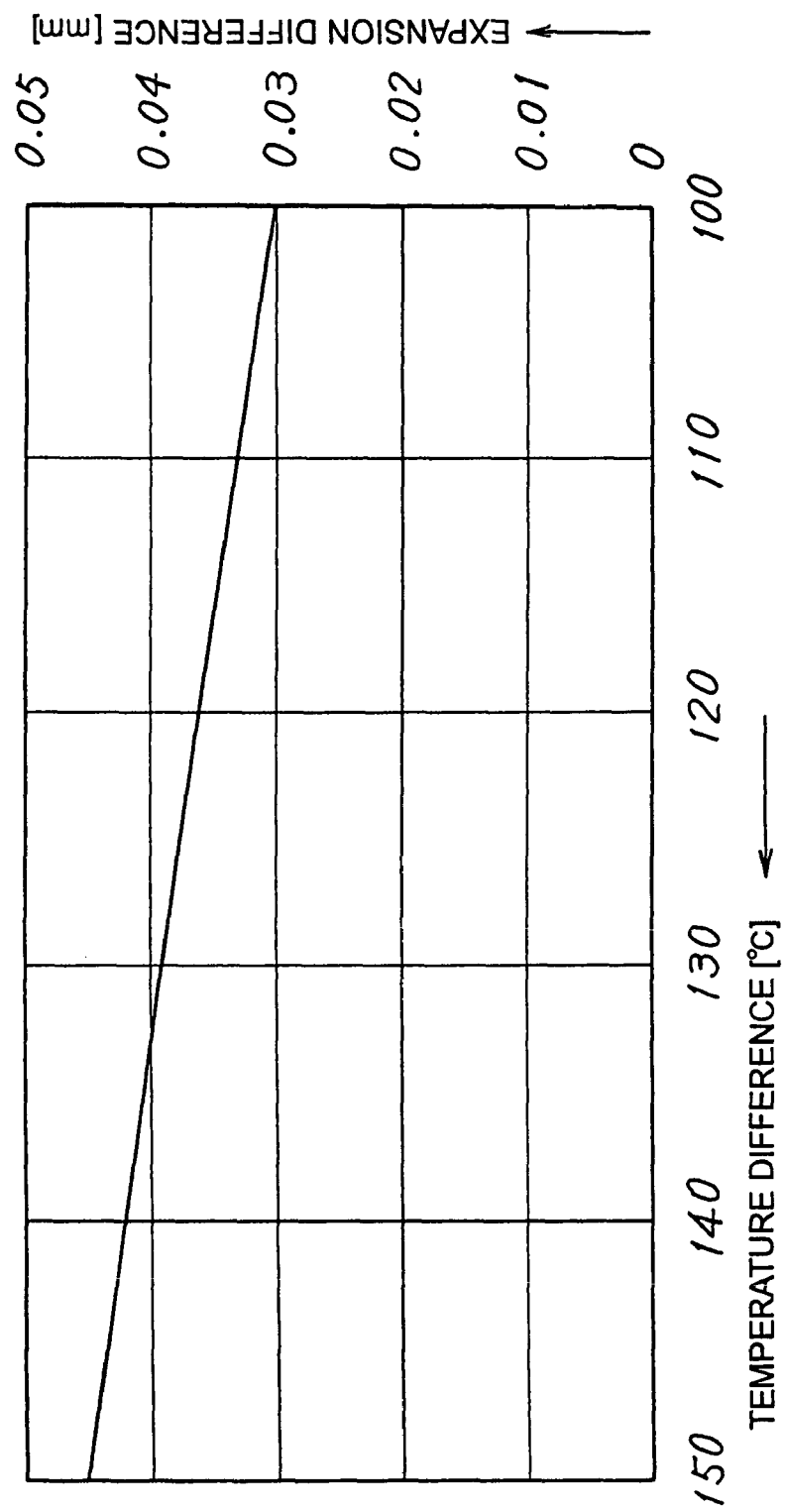
FIG. 8 is a measurement curve characterizing the relation of temperature difference and expansion difference in an embodiment.

FIG. 7 shows a measurement curve of the angle of the inside diameter and flux of a neodymium magnet in an embodiment of characteristics. FIG. 8 shows a measurement curve of temperature difference and expansion difference in an embodiment of characteristics.

In consideration of the fact that as shown in FIG. 7, the smaller the angle of inside diameter of the magnet, the worse the magnetic properties and that as shown in FIG. 8, the larger the temperature difference, the larger the expansion difference, it was experimentally obtained that the best result is obtained when the angle of inside diameter of both arc-shaped ends of each of the four-part divided magnets 12-1 to 12-4 shown in Table 6 with respect to an axis center is not less than 88° but not more than 89.8°.

In this manner by providing the gap 35 between the permanent magnets 12-1 to 12-4, cracks do not occur any more in the permanent magnets 12-1 to 12-4, with the result that it is possible to expand the range of selection of, for example, epoxy and other thermosetting adhesives.

Figure 9:
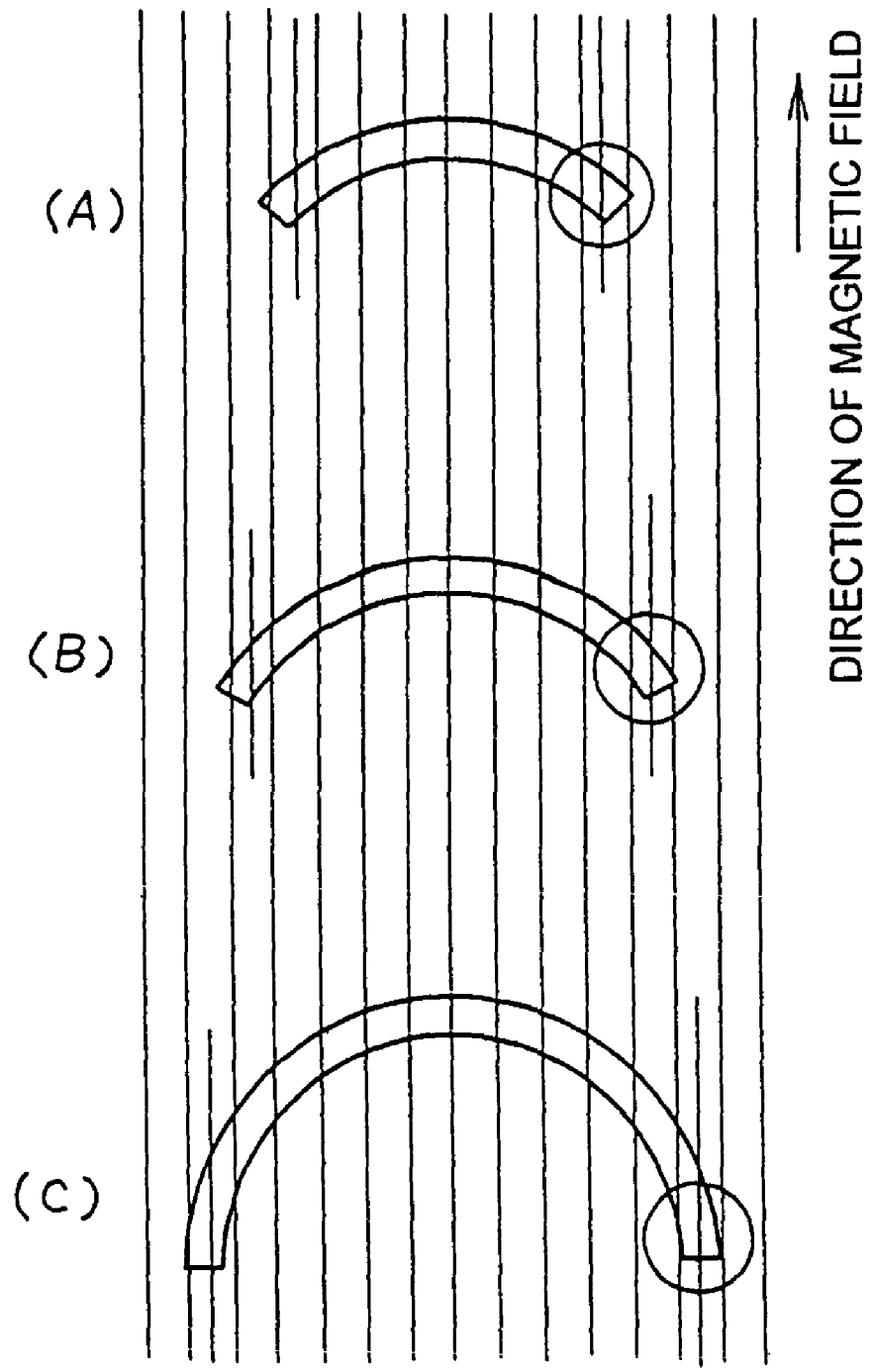
FIG. 9 is an explanatory view to compare characteristics when a permanent magnet is divided into four, three and two parts.

FIG. 9 shows an explanatory view to compare characteristics when a permanent magnet is divided into four, three and two parts; FIG. 9(A) shows a four-part divided permanent magnet, FIG. 9(B) a three-part divided one, and FIG. 9(C) a two-part divided one.

When a cylindrical permanent magnet is divided and each of the divided permanent magnets is firmly fixed to the outer peripheral surface of the core pole 7-2, in the case of the three-part divided magnet and the case of the two-part divided magnet, magnetization is performed during forming by applying a magnetic field parallel to the direction of the arrow shown in FIG. 9 and, therefore, the orientation of grains of the portion at an end enclosed with a circle does not become radial.

It is apparent that in contrast to this, in the case of the four-part divided magnet, the orientation of grains of the portion at an end enclosed with a circle becomes much better than that of the three-part divided magnet and the two-part divided magnet. On the other hand, when the number of divided parts is increased, repelling occurs at a junction between magnets and the magnetic force becomes lost. Furthermore, it follows that it takes increased labor to firmly fix the magnets to the core pole 7-2. Considering the magnetic properties and labor together from a comprehensive standpoint, the four-part divided magnet is the best selection and the five-part divided magnet is the second-best selection.

A neodymium magnet or a rare-earth magnet is used here as the four-part divided permanent magnet 12. This neodymium magnet or rare-earth magnet is a high-performance magnet and has a high permanent magnetic flux density Br. Therefore, the magnetic coil 14 is disposed in the annular magnetic gap 13 and hence it is possible to perform designing by use of a working point of the permanent magnet near BHmax and working is possible even when an alternating current which is caused to flow through the electromagnetic coil 14 is small. Therefore, the efficiency is increased and a high efficiency of the vibration type compressor is obtained.

Incidentally, neodymium magnets are subjected to surface treatment such as plating for rust prevention. In the vibration type compressor 1, however, the environment in which each of the four-part divided permanent magnets 12-1 to 12-4 of this neodymium magnet is placed is an environment within the gastight vessel 2 where oxygen is not present and there are only a refrigerant (for example, HFC-134a) and a dedicated lubricating oil which matches this refrigerant, plating treatment in the sense of rust prevention is not performed. This plating-less design widens the range of selection of adhesives and contributes also to cost cutting.

Figure 10:
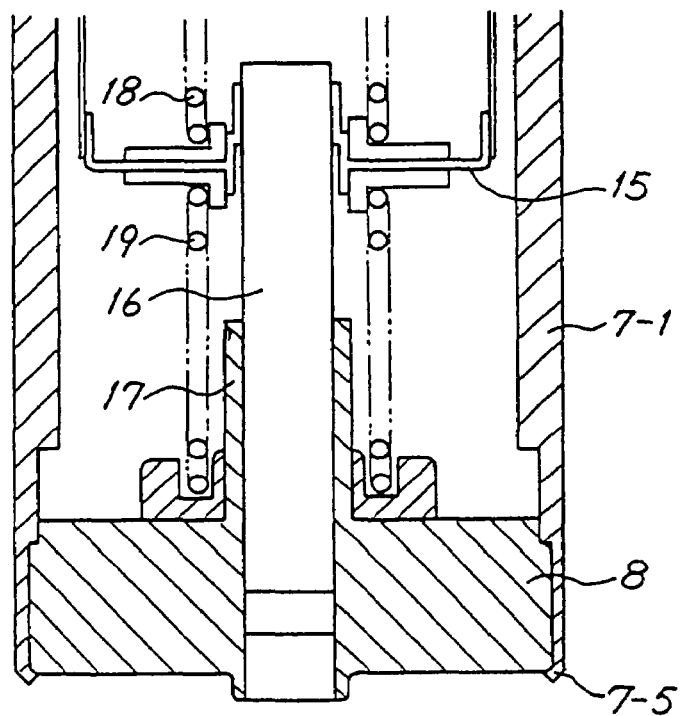
FIG. 10 is a view to explain the fixing a yoke and a cylinder block related to the present invention in an embodiment.

FIG. 10 shows a view to explain the fixing a yoke and a cylinder block related to the present invention in an embodiment.

In this figure, the same parts as in FIG. 1 are given the same numerals as in FIG. 1. The leading end portion of the yoke 7-1 of the invention, i.e., the inside diameter of the inner side of the bottom end portion is cut to a shape into which the cylinder block 8 is fitted. At the same time, the crimping portion 7-5 is formed in the leading end portion of this yoke 7-1 and in this crimping portion 7-5, the end surface of the cylinder block 8 to be fitted into the yoke 7-1 is crimped and fixed. As the crimping portion 7-5 formed in the leading end portion of this yoke 7-1 is formed, at least two or more crimping portions are formed to ensure that the cylinder block S is partially crimped or the crimping portion 7-5 is formed along the full circumference of the leading end portion of the yoke 7-1 so that the full periphery of the cylinder block 8 is crimped.

Because in this manna the cylinder block 8 is crimped partially or along the full periphery thereof in the leading end portion of the yoke 7-1, it is possible to set an optimum diameter of the yoke 7-1 without using another piece. Furthermore, because no screw is used, the time of screw tightening and working time of screw cutting are unnecessary and besides in the assembly work which required caution, the cylinder block 8 can be uniformly and easily fixed by adopting the method by which crimping is preformed.

Furthermore, because the construction is such that the permanent magnet 12, ie., the four-portion divided permanent magnets 12-1 to 12-4 are provided on the side of the core pole 7-2 through the magnet-mounting groove 11 and, at the same time, the cylinder block 8 is crimped in the crimping portion 7-5 formed in the leading end portion of the yoke 7-1, the outside diameter of the casing 6 can be reduced and hence the miniaturization of the vibration type compressor 1 can be accomplished.

Figure 11:
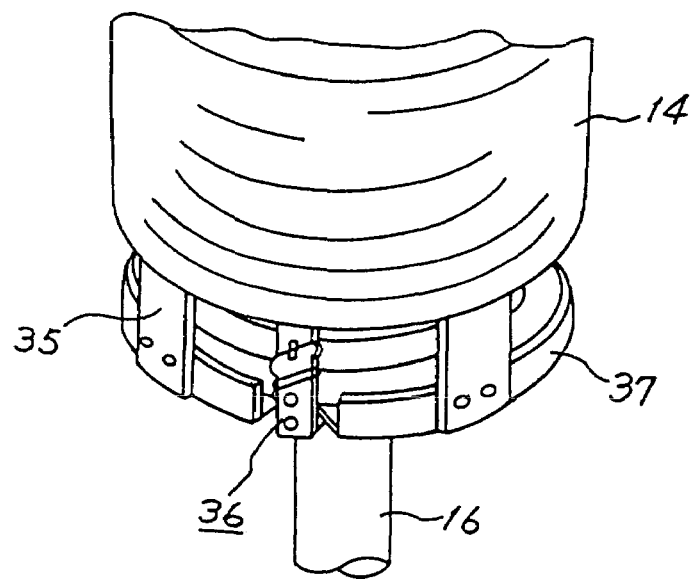
FIG. 11 is a partial perspective view of an electromagnetic coil in which a lead plate related to the present invention is used.

FIG. 11 shows a partial perspective view of an electromagnetic coil in which a lead plate related to the present invention is used.

In this figure, the same parts as in FIG. 1 are given the same numerals as in FIG. 1. Both ends of the lead plate 36 are each provided with a protrusion 36-1 in a shifted position as shown in a partially enlarged view of an embodiment of a lead plate of FIG. 12. Furthermore, a convexity 36-2 is formed as shown in FIG. 13 in the middle position of the width of this lead plate 36 and, at the same time, in the middle portion of the two protrusions 36-1. Incidentally, in FIG. 11, the numeral 35 denotes a coil yoke plate and the numeral 37 denotes a flanged portion.

Figure 14:
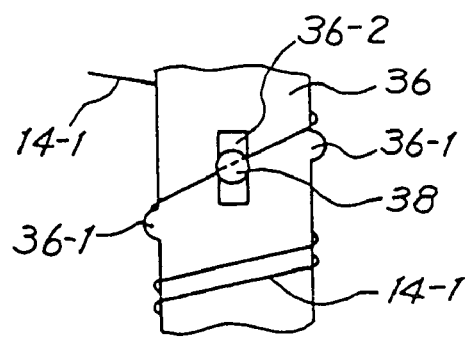
FIG. 14 is a view to explain the connection of a terminal of an electromagnetic coil in the portion of a lead plate.

Because the lead plate 36 assumes a shape as described above, when the terminal 14-1 of the electromagnetic coil 14 is wound around as shown in FIG. 14 by use of the two protrusions 36-1, it follows that the terminal 14-1 of the electromagnetic coil 14 is wound around the lead plate 36 in such a manner that this terminal passes through the position of the convexity 36-2. At this time, a shift of the terminal 14-1 of the electromagnetic coil 14 can be prevented by means of the two protrusions 36-1, and by performing welding in the position of the convexity 36-2, the lead plate 36 and the terminal 14-1 of the electromagnetic coil 14-1 can be positively welded together in a weld 38 (refer to FIG. 14).

Figure 15:
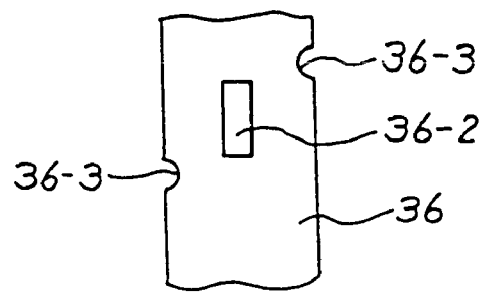
FIG. 15 is a partially enlarged view of another embodiment of a lead plate.

FIG. 15 shows a partially enlarged view of another embodiment of a lead plate.

Figure 12:
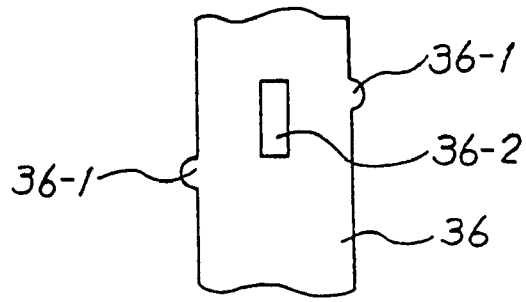
FIG. 12 is a partially enlarged view of an embodiment of a lead plate.
Figure 13:
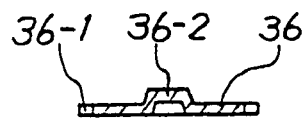
FIG. 13 is a front view of FIG. 12.

In the case of FIG. 15, notches 36-3 are formed in place of the protrusions 36-1 of FIG. 12. The two notches 36-3 can provide the same action as in the case of the protrusions 36-1 of FIG. 12.

Figure 16:
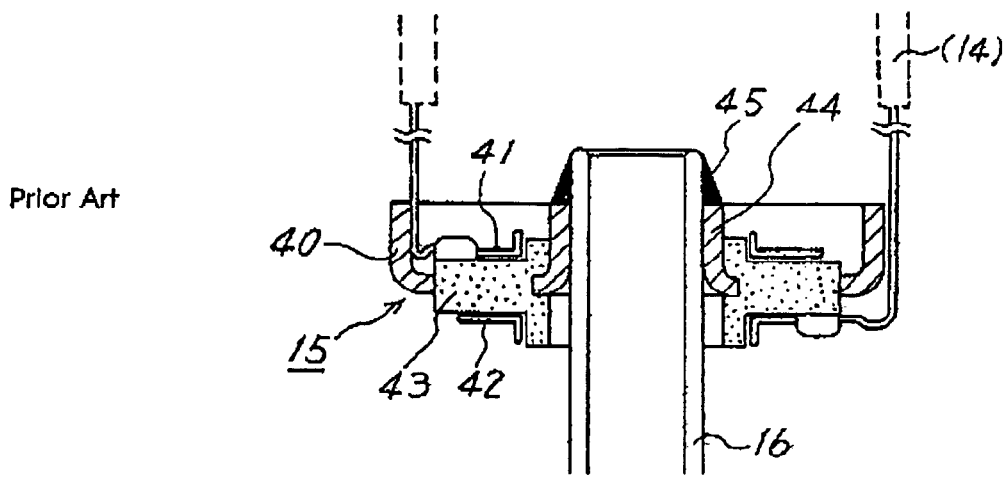
FIG. 16 is a view to explain a conventional structure of the portion of a supporting member of a piston and of a coil.
Figure 17:
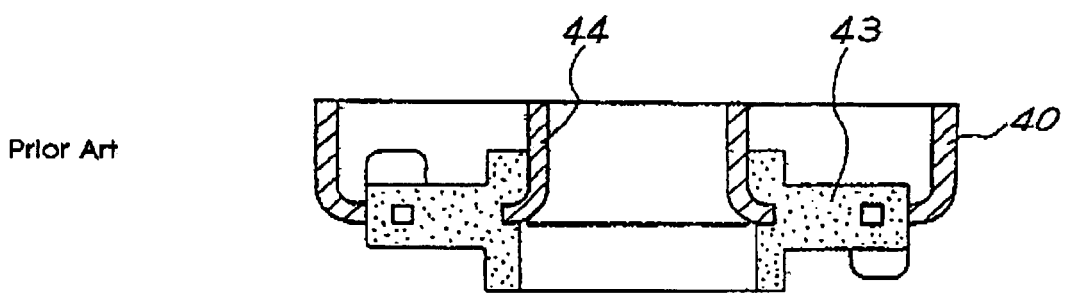
FIG. 17 is a view to explain a conventional structure of the portion of a supporting member of a piston and of a coil.
Figure 18:
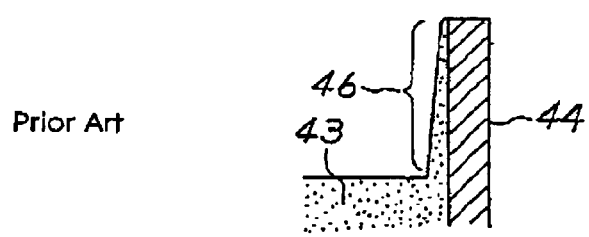
FIG. 18 is a view to explain a conventional structure of the portion of a supporting member of a piston and of a coil.

FIG. 16 to FIG. 18 are views to explain a conventional structure of the portion of a supporting member of a piston and of a coil.

In the figures, the numeral 15 denotes a supporting member, the numeral 16 a piston, the numeral 40 a flange, the numerals 41, 42 respectively terminals (of the electromagnetic coil), the numeral 43 an insulator, which is formed by resin mold, the numeral 44 a collar, and the numeral 45 a weld.

In the conventional case, as shown in FIG. 16, the flange 40 serves to support the insulator 43 and as shown in FIG. 17, the flange 40 and the collar 44 provide a dish-shaped one-piece body formed from a metallic body and are formed by being integrally molded so that the insulator 43 (resin) is mechanically fixed to this dish-shaped body via a hole present in the bottom surface of the dish-shaped body. And the terminals 41, 42 to energize the electromagnetic coil are fixed by screw cramping, for example, to the top surface and bottom surface of the insulator 43 shown in FIG. 17, which are horizontal surfaces.

In a molded condition as shown in FIG. 17, the collar 44 is welded to the piston 16 in the weld 45 as shown in FIG. 16. Furthermore as described above, the magnetic coil is electrically connected to the terminals 41, 42. That is, the piston 16 vertically moves the whole electromagnetic coil at the same time with the movement of the piston.

In the conventional case, the supporting member is configured as described above with reference to FIG. 16 and FIG. 17, posing the following problem. That is, as shown in FIG. 18, undesirably a fin 46 occurring during the molding of the insulator 43 is often formed on the internal dimension side of the annular collar 44. For this reason, this fin 46 was manually removed by manual work and the work was complicated.

Moreover, because the fabrication process of the flange (and the collar) and the molding process use completely different manufacturing machines, the distribution channel is long in terms of time and rust is apt to occur in the flange (and the collar). For this reason, in the working of the flange (and the collar), a rust-preventing oil is applied after the working of metal portions. And in the resin mold process, the rust-preventing oil is rinsed out as pretreatment and molding is performed after that. Because at this time as described above, resin drops may sometimes occur during resin mold due to variations in the plate thickness of the flange (and the collar), the step of fin removal because of the occurrence of drops becomes necessary. This leads to an increase in the number of manufacturing steps and a cost increase.

In addition, there is a fear of burning of the resin portion during the welding of the collar and the piston. For this reason, it is preferred to adopt a technique which does not require molding, in which rust is less apt to occur and which makes the step of fin removal unnecessary. Furthermore, it is also preferred that the burning of resin due to a change of the order of steps does not occur. The supporting member which will be described next has a structure in which these drawbacks are improved.

Figure 19:
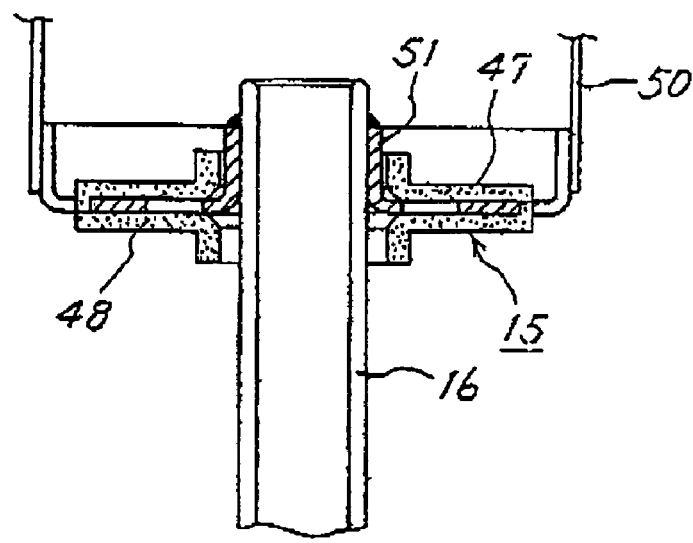
FIG. 19 is a view to explain another embodiment of the attachment of a supporting member of an electromagnetic coil used in the present invention.
Figure 20:
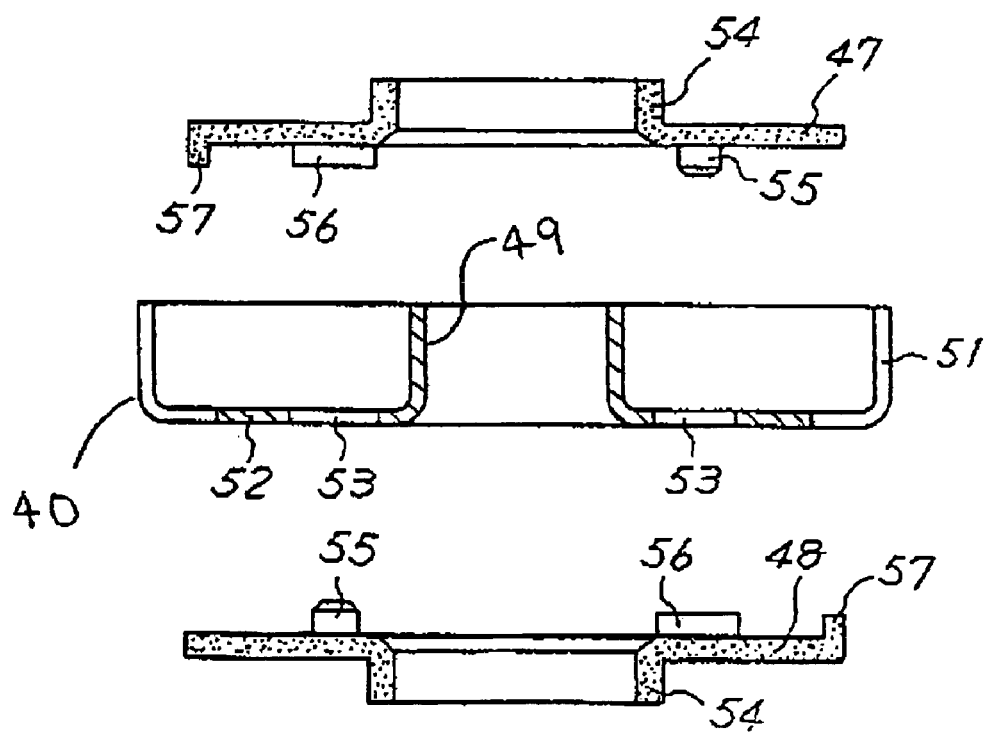
FIG. 20 is an exploded explanatory view of a supporting member.
Figure 21:
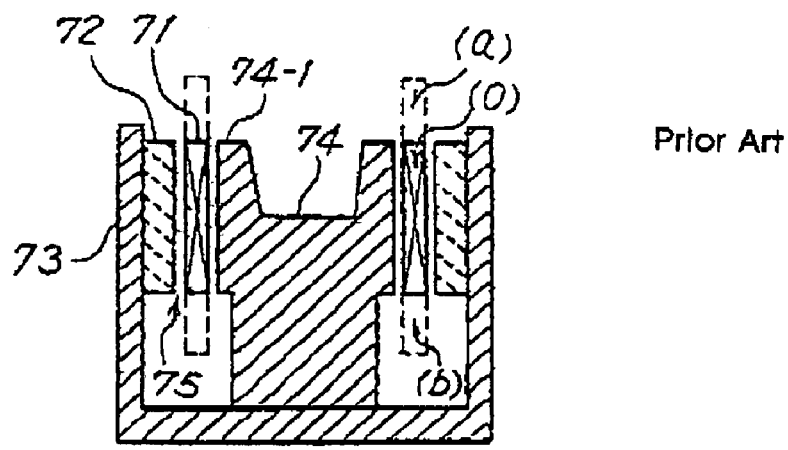
FIG. 21 is a partial sectional view to explain the principle of a conventional vibration type compressor.
Figure 22:
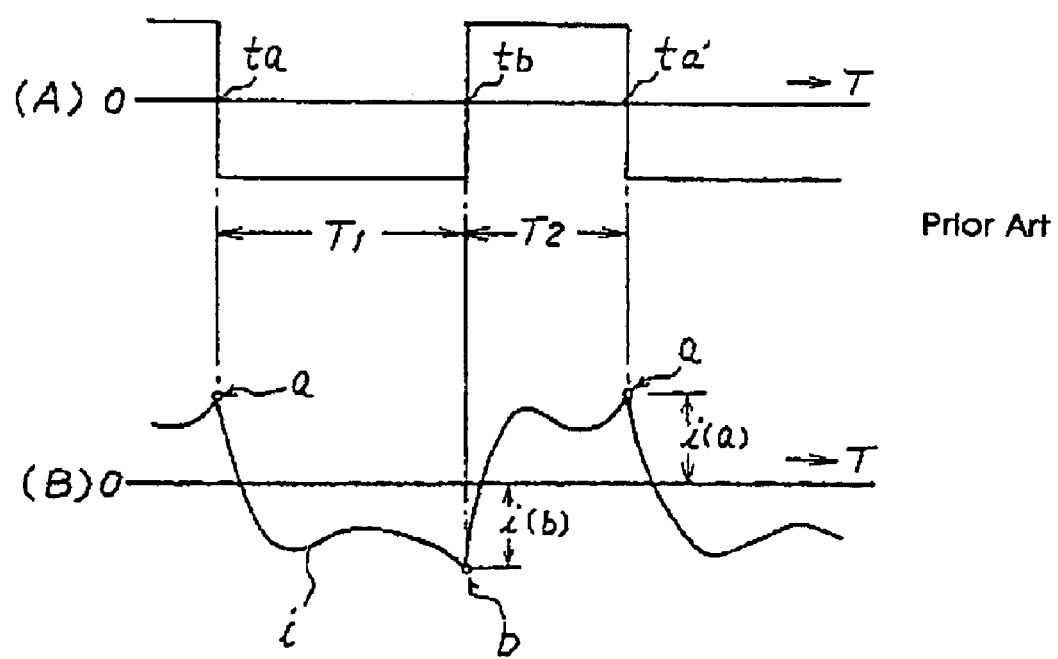
FIG. 22 is a view showing the voltage waveform and current waveform supplied to a vibration type compressor.

FIG. 19 shows a view to explain another embodiment of the attachment of a supporting member of an electromagnetic coil used in the present invention and FIG. 20 shows an exploded explanatory view of a supporting member.

In FIG. 19 and FIG. 20, the supporting member 15 is constituted by two base materials 47, 48 fabricated from an insulator having the same shape as that of the flange 40. The flange 40 comprises an inside-diameter boss portion 49, which has in the central portion thereof a hole of a diameter into which the piston 16 is fitted, and an outside-diameter rib portion 51, which has the outside diameter of an electromagnetic coil supporting plate 50 which supports the electromagnetic coil 14, and a plurality of holes 53 are drilled to support and fix the flange 40 from both sides thereof by means of the two base materials 47, 48 in a disk portion 52 formed by the inside-diameter boss portion 49 and the outside-diameter rib portion 51.

The two base materials 47, 48 having the same shape are formed from a disk-shaped insulator and comprise respectively an inside-diameter rib portion 54, which has in the central portion thereof a diameter into which the inside-diameter boss portion 49 provided in the flange portion 40 is fitted, an engaging member 55, which is provided on a surface on the side opposite to the side where this inside-diameter rib portion 54 is formed and in which a locking convexity is provided in a position corresponding to the hole 53 drilled in the disk portion 52 of the flange 40, an engaging member 56, in which a locking concavity which engages against the locking convexity of the engaging member 55 is provided, and at least one protrusion 57, which is provided at an end edge portion of the surface provided with the engaging members 55, 56 and has flat surfaces.

In assembling the supporting member 15 on the piston 16 as shown in FIG. 19, the flange 40 is attached to a prescribed position of the piston 16 by welding, the two base materials 47, 48 of the same shape are placed to face as shown in FIG. 20, and the engaging members 55, 56 provided respectively in the base materials 47, 48 are fitted into the holes 53 drilled in the flange 40 and mutually depressed so that the flange 40 is fixed in a sandwiched condition between the two base materials 47, 48.

Because in this manner molding is not performed in the supporting member 15 of the construction shown in FIG. 19 and FIG. 20, rust is not apt to occur and the step of fin removal becomes unnecessary. Furthermore, because the order of steps is changed, that is, the flange 40 is first fixed to the piston 16 by welding, the burning of the resin of the base materials 47, 48 does not occur.

As is apparent from the above descriptions it will be understood that the supporting member has become suitable for mass production.

Incidentally, though not shown in FIG. 19 and FIG. 20, the two base materials 47, 48 are adapted for provision of terminals to which a lead wire from the electromagnetic coil 14 is connected.

As described above, according to the present invention, because a permanent magnet fabricated from a neodymium magnet or a rare-earth magnet is disposed on the side of a cylindrical core pole, an alternating current flowing through an electromagnetic coil decreases due to high permanent magnetic flux density design of a magnetic gap in which the magnetic coil is disposed, with the result that a vibration type compressor of high efficiency can be provided. And because an optimum number of divisions of the permanent magnet which is at least 4 is selected from the relation between cost and magnetic properties of the permanent magnet, and the permanent magnet is divided by the optimum number of divisions of 4, a neodymium magnet or rare-earth magnet having a high permanent magnetic flux density Br can be effectively used and the efficiency of the vibration type compressor can be improved. And a gap is also provided between the four-divided permanent magnets, no crack will occur in the permanent magnets even by a temperature change.

Members to prevent the shift of the terminal of the electromagnetic coil are provided in a lead plate used in assembling the electromagnetic coil and the lead plate is given a shape which ensures electrical contact of the terminal of the electromagnetic coil by welding. Therefore, productivity increases and electrical connection of good quality can be obtained. Furthermore, when the supporting member is configured in such a manner that the supporting member is supported and fixed from both sides thereof in a sandwiched condition by the flange welded to the piston and two base materials, the supporting member becomes suitable for mass production.

INDUSTRIAL APPLICABILITY

As described above, the vibration type compressor related to the present invention is useful as a vibration type member in which a low-pressure refrigerant is caused to flow into a gastight vessel and a compressed high-pressure refrigerant is delivered.

What is claimed is:

1. A vibration type compressor, in which a compressor main body is housed in a gastight vessel comprising a power supply terminal, a suction pipe into which a low-pressure refrigerant flows and a delivery pipe from which a high-pressure refrigerant flows, the compressor main body comprising:
   a cylindrical yoke;
   a magnetic path member formed from a column-shaped core pole which closes an end of said cylindrical yoke and protrudes to inside said cylindrical yoke coaxially via a cylindrical core pole side, said magnetic path member cooperating with said cylindrical yoke to define a magnetic path along a longitudinal direction of said magnetic path member;
   a cylindrical permanent magnet arranged in the magnetic path;
   a mechanical vibration system;
   an electromagnetic coil which is arranged within a gap between the magnetic path member and the cylindrical permanent magnet by being supported by said mechanical vibration system so as to be able to vibrate and said electromagnetic coil being wound around a lead plate to function as the connection of a terminal thereof;
   a supporting member which supports the electromagnetic coil;
   a piston connected to the electromagnetic coil through the supporting member; and
   a cylinder block which closes the other end of the cylindrical yoke and defines with said yoke and said magnetic path member an interior formed as a low-pressure chamber communicating with the suction pipe, a high-pressure chamber communicating with the delivery pipe and a cylinder housing the piston, the vibration type compressor being so configured as to vibrate the piston connected to the electromagnetic coil by supplying an alternating current to the electromagnetic coil and to discharge a compressed high-pressure refrigerant from the delivery pipe, said cylindrical permanent magnet being formed from a neodymium magnet or a rare-earth magnet and said cylindrical permanent magnet being divided into at least four parts in the axial direction thereof, the divided magnet being bonded and fixed to said cylindrical core pole side, wherein said four parts of the divided magnet are evenly spaced from each other providing a defined gap between opposite ends of each of said four parts and said four parts are arranged around on the outer surface of said column-shaped core pole.

2. The vibration type compressor according to claim 1, wherein the four-part divided magnet is formed in such a manner that the angle between the ends of each of the arc shaped four-part divided magnets with respect to an axis center is not less than 88° but not more than 89.8°, both arc-shaped ends of each magnet being bonded and fixed to a column-shaped core pole side each with the defined gap.

3. The vibration type compressor according to claim 1, wherein in the core pole is formed a magnet-mounting groove to which the four-part divided magnet is bonded, in that an end portion of the magnet-mounting groove is provided with a clearance groove for positioning having a diameter smaller than the outside diameter of the magnet-mounting groove so that the magnet can be bonded in a prescribed position of the core pole to precise dimensions, and in that a small rib is provided in a circumferential portion at an engaging portion of the core pole where the core pole engages with the cylindrical yoke.

4. A vibration type compressor, in which a compressor main body being housed in a gastight vessel comprising a power supply terminal, a suction pipe into which a low-pressure refrigerant flows and a delivery pipe from which a high-pressure refrigerant flows, the compressor main body comprising:
   a cylindrical yoke;
   a magnetic path member formed from a column-shaped core pole which closes an end of said cylindrical yoke and protrudes to inside said cylindrical yoke coaxially, via a cylindrical core pole side, said magnetic path member cooperating with said cylindrical yoke to define a magnetic path along a longitudinal direction of said magnetic path member;
   a cylindrical permanent magnet arranged in the magnetic path;
   a mechanical vibration system;
   an electromagnetic coil which is arranged within a gap between the magnetic path member and the cylindrical permanent magnet by being supported by said mechanical vibration system so as to be able to vibrate and said electromagnetic coil being wound around a lead plate to function as the connection of a terminal thereof:

a supporting member which supports the electromagnetic coil;

a piston connected to the electromagnetic coil through the supporting member; and a cylinder block which closes the other end of the cylindrical yoke and defines with said yoke and said magnetic path member an interior formed as a low-pressure chamber communicating with the suction pipe, a high-pressure chamber communicating with the delivery pipe and a cylinder housing the piston, the vibration type compressor being so configured as to vibrate the piston connected to the electromagnetic coil by supplying an alternating current to the electromagnetic coil and to discharge a compressed high-pressure refrigerant from the delivery pipe, said cylindrical permanent magnet being formed from a neodymium magnet or a rare earth magnet and said cylindrical permanent magnet being divided into at least four parts in the axial direction thereof, each of the divided magnets having a plating-less surface, being bonded and fixed to said cylindrical core pole side, wherein said four parts of the divided magnet are evenly spaced from each other providing a defined gap between opposite ends of each of said four parts and said four parts are arranged around on the outer surface of said column-shaped core pole.

5. A vibration type compressor, in which a compressor main body being housed in a gastight vessel comprising a power supply terminal, a suction pipe into which a low-pressure refrigerant flows and a delivery pipe from which a high-pressure refrigerant flows, the compressor main body comprising:

a cylindrical yoke;

a magnetic path member formed from a column-shaped core pole which closes an end of said cylindrical yoke and protrudes to inside said cylindrical yoke coaxially via a cylindrical core pole side, said magnetic path member cooperating with said cylindrical yoke to define a magnetic path along a longitudinal direction of said magnetic path member;

a cylindrical permanent magnet arranged in the magnetic path;

a mechanical vibration system;

an electromagnetic coil which is arranged within a gap between the magnetic path member and the cylindrical permanent magnet by being supported by said mechanical vibration system so as to be able to vibrate and said electromagnetic coil being wound around a lead plate to function as the connection of a terminal thereof:

a supporting member which supports the electromagnetic coil;

a piston connected to the electromagnetic coil through the supporting member; and a cylinder block which closes the other end of the cylindrical yoke and defines with said yoke and said magnetic path member an interior formed as a low-pressure chamber communicating with the suction pipe, a high-pressure chamber communicating with the delivery pipe and a cylinder housing the piston, the vibration type compressor being so configured as to vibrate the piston connected to the electromagnetic coil by supplying an alternating current to the electromagnetic coil and to discharge a compressed high-pressure refrigerant from the delivery pipe, wherein the supporting member comprises a flange and two base materials;

the flange comprising an inside-diameter boss portion, which has in the interior portion thereof a diameter into which the piston is inserted, and an outside-diameter rib portion, which has the outside diameter of an electromagnetic coil supporting plate which supports the electromagnetic coil, with a plurality of holes being drilled in a disk portion formed by the inside-diameter boss portion and the outside-diameter rib portion; and the two base materials formed from a disk-shaped insulator each comprising an inside-diameter rib portion, which has in the central portion thereof a diameter into which the inside-diameter boss portion provided in the flange portion is fitted, engaging members, which are provided on a surface on the side opposite to the side where the inside-diameter rib portion is formed and in which a locking convexity and a locking concavity are provided in positions corresponding to the holes drilled in the disk portion of the flange, and at least one protrusion, which is provided at an end edge portion of the surface provided with the engaging members, and characterized in that the supporting member is configured to be of such a construction that the flange is supported and fixed from both sides thereof in a sandwiched condition by means of the two base materials.

* * * * *